T. A. MAGUIRE.
ATTACHMENT FOR HORSESHOES.
APPLICATION FILED APR. 8, 1913.
1,117,583.
Patented Nov. 17, 1914.
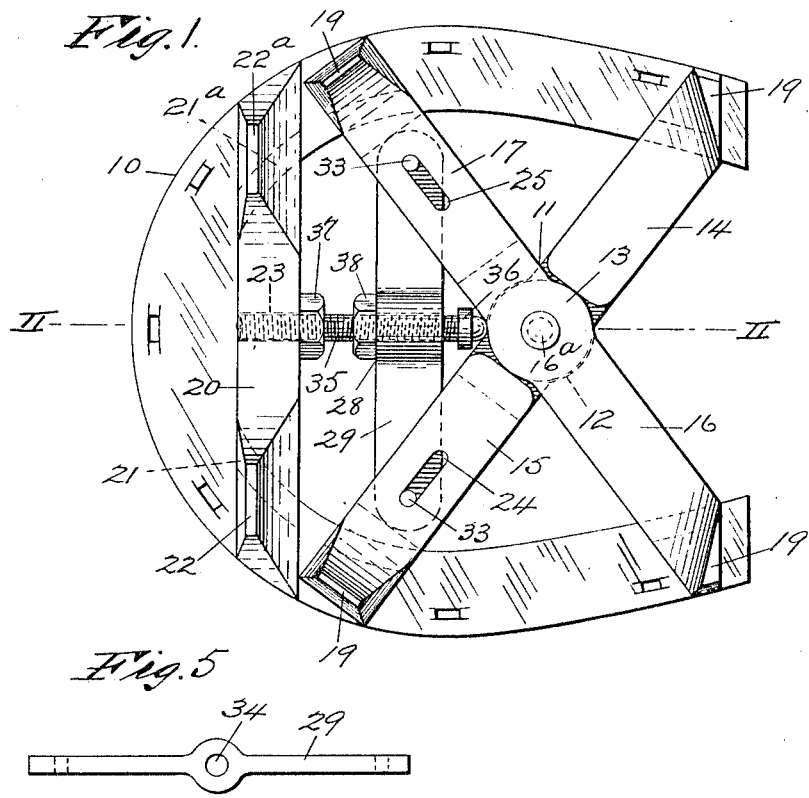
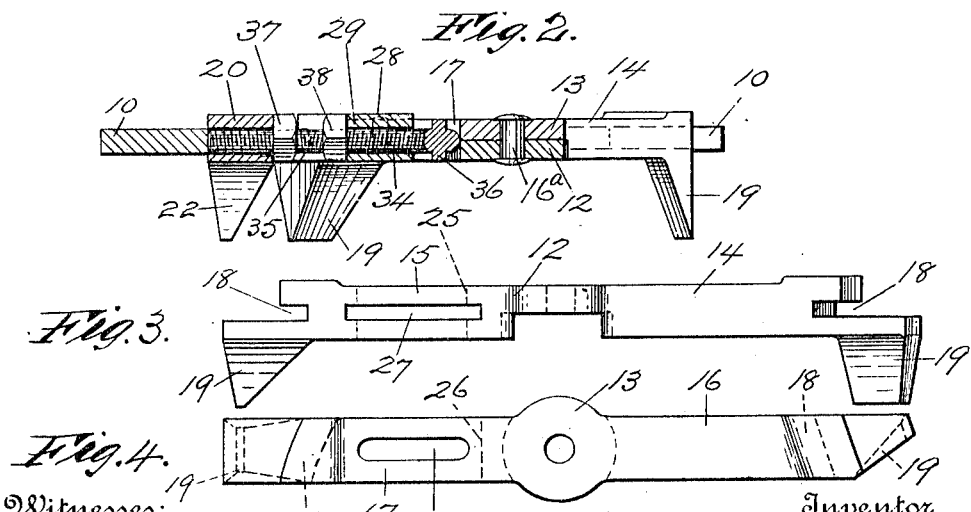
Witnesses:
Chas C. Abbe
M. Dumody
Inventor
Thomas A. Maguire
By his Attorney
W. T. Criswell

UNITED STATES PATENT OFFICE.

THOMAS A. MAGUIRE, OF NEW YORK, N. Y.

ATTACHMENT FOR HORSESHOES.

1,117,583.      Specification of Letters Patent.      Patented Nov. 17, 1914.

Application filed April 8, 1913. Serial No. 759,709.

*To all whom it may concern:*

Be it known that I, THOMAS A. MAGUIRE, a citizen of the United States, and a resident of New York, county and State of New York, have invented a certain new and useful Improvement in Attachments for Horseshoes, of which the following is a full, clear, and exact specification.

This invention relates to a class of devices adapted to be used upon the hoofs of animals.

My invention has for its object primarily to provide a simple and efficient attachment, or device designed to be employed for permitting animals to travel safely over slippery highways, and which is adapted to be removably applied to horse shoes especially when the animal is smooth shod so as to be used in emergency whereby the necessity for rough shoeing the animal may be obviated. This is accomplished mainly by providing a supporting member having a plurality of pivotally connected arms adapted to be relatively adjusted to and from each other so as to be fitted between the arms of horse shoes of various sizes and upon the ends of the bars are provided calks to prevent the animal from slipping when in use.

Another object of the invention is to provide a holding plate also adapted to be applied to the horse shoe; and a further object of the invention is to provide a locking element which serves to force the arms of the supporting member into engagement with the horse shoes as well as holding the device thereto against accidental displacement.

With these and other objects in view the invention will be hereinafter more particularly described with reference to the accompanying drawing, which forms a part of this specification, and will then be pointed out in the claims at the end of the description.

On the drawing, Figure 1 is an inverted plan of a horse shoe with one form of attachment embodying my invention applied thereto. Fig. 2 is a section taken on the line II—II of Fig. 1. Fig. 3 is a side elevation of two of the arms of the supporting member employed in the device. Fig. 4 is a top plan of two other arms of the supporting member used in the device, and Fig. 5 is an edge view of the transverse bar used in conjunction with the locking element of the device.

The attachment, or device may be used in conjunction with the usual, or any preferred form of horse shoe, as 10, but is adapted to be applied preferably to forms of shoes which are free from calks when fitted upon the hoofs of an animal so as to be employed in emergency to permit the animal to travel safely upon slippery highways, and said attachment is provided with a supporting member 11.

The supporting member 11 has two circular plates 12 and 13, and from diametrically opposite parts of the periphery of each of said plates are projecting arms, as 14, 15, 16 and 17 whereby the arms are disposed radially with respect to the axial center of the plates. The plates 12 and 13 are pivotally connected, at $16^a$, for permitting the arms to be relatively moved angularly so as to be adjusted in directions to and from each other whereby the supporting member may be detachably fitted between the arms of horse shoes of various sizes. Serving to permit the supporting member 11 to be detachably connected to a horse shoe, transversely of the free end of each of the arms is a recess, as 18. In the recesses 18 are received the inner edges of the arms of the horse shoe when the device is fitted thereto, as shown in Fig. 1, and upon the exposed surface of each of the arms of the supporting member at the free end thereof is provided a calk 19. The calks 19 may be of the usual, or any preferred shapes to extend a suitable distance from the horse shoe for being adapted to penetrate a slippery surface so that the animal may secure a firm foothold when traveling.

Adapted to be detachably applied to the toe portion of the horse shoe is a transverse holding bar 20, and crosswise of the free ends of said holding bar are recesses 21 and $21^a$ for reception of the inner edge of the shoe so that said holding bar may be held thereto. Also upon the exposed surface of the holding bar 20 at the free ends thereof are provided calks, as 22 and $22^a$, and through the central part of said bar is an aperture 23.

Longitudinally of the arms 15 and 17 of the supporting member 11 are elongated slots 24 and 25, and longitudinally through the edges of said arms are similar elongated slots 26 and 27, each of which communicates with one of the slots 24 and 25. For the purpose of adjustably moving in unison the arms 14, 15, 16, 17 of the supporting member as well as the holding bar 20 into close engagement with the shoe and securing these parts thereto against accidental displacement, I provide a locking element, as 28.

The locking element 28 has a transverse bar 29, and each of the ends of said bar is movably inserted in one of the elongated slots 26 and 27. Through an opening in each end of the bar 29 is held a pin 33, and each of said pins is of sufficient length so that its ends are movably guided into one of the elongated slots 24 and 25 of the arms 15 and 17. Through the central part of the transverse bar 29 is an aperture 34 which is in register with the aperture 23 of the holding bar 20, and freely movable in both of said apertures is a threaded rod 35 having a collar as 36, on one end thereof. Upon the rod 35 and between the bars 20 and 29 are screwed two adjusting nuts 37 and 38 with right and left hand threads, respectively. When the attachment or device is applied to a horse shoe the holding bar 20 is arranged between the arms of the shoe so that the inner edge of the front portions thereof will be received in the recesses 21 and 21ª of this bar. The supporting member 11 is then arranged between the arms of the shoe so that the inner edges thereof will be inserted in the recesses 18 of the arms 14, 15, 16, 17, and the end of the threaded rod 35 opposite to its collar 36 is guided through the aperture 23 of the holding bar 20. By rotating the adjusting nut 37 upon the rod 35 the transverse bar 29 will be moved toward the plates 12 and 13 of the supporting member 11, and the arms 14, 15, 16, 17 will be carried by the rod 35 in the opposite direction when the nut 38 is suitably positioned upon the rod to bear against the bar 29, but only when the bar 20 bears against the toe of the shoe. After the parts are partially adjusted by the proper adjustment of the two nuts 37 and 38, on the right and left hand threads of the rod 35, then it will be seen that by a slight movement of either of said nuts the parts may be rigidly locked in position.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a device of the character described, adapted to be removably applied to a horse shoe, two plates, each having two diametrically opposed arms thereon, the central portions thereof pivotally connected whereby all of the arms may be relatively moved angularly so as to be disposed between the arms of the horse shoe, each of the arms having a transverse recess in its free end for reception of the inner edge of the shoe, and each of said arms being provided with a calk, a transverse bar adapted to be disposed between the arms of the shoe, said bar having transverse recesses in its ends for reception of the inner edge of the shoe, and means adapted to simultaneously move the transverse bar and all of said arms so that the inner edge of the shoe will be received in the recesses thereof and lock said arms and the transverse bar thereto.

2. In a device of the character described, adapted to be removably applied to a horse shoe, two plates, each having two diametrically opposed arms thereon, the central portions thereof pivotally connected whereby all of the arms may be relatively moved angularly so as to be disposed between the arms of a horse shoe, each of the arms being provided with a calk, and each of said arms having a recess in its free ends for reception of the inner edge of the shoe, a transverse bar adapted to be disposed between the arms of the shoe, said bar having transverse recesses in its ends for reception of the inner edge of the shoe and said transverse bar also being provided with calks, a second bar having its ends slidably pivoted to two of the opposed arms, a threaded rod rotatably held to each of said bars, and nuts rotatable upon the threaded rod and adapted when adjusted to simultaneously move the transverse bar and the second bar for adjusting all of the arms so that the inner edge of the shoe will be received in the recesses of the transverse bar and said arms, whereby the device may be detachably secured to the shoe.

This specification signed and witnessed this seventh day of April A. D. 1913.

THOMAS A. MAGUIRE.

Witnesses:
ROBT. B. ABBOTT,
M. DERMODY.